United States Patent [19]
Bourbeau

[11] Patent Number: 5,666,040
[45] Date of Patent: Sep. 9, 1997

[54] NETWORKED BATTERY MONITOR AND CONTROL SYSTEM AND CHARGING METHOD

[76] Inventor: Frank Bourbeau, 5411 Toltec Dr., Santa Barbara, Calif. 93111

[21] Appl. No.: 704,226

[22] Filed: Aug. 27, 1996

[51] Int. Cl.$^6$ ................................................. H01M 10/46
[52] U.S. Cl. .................................. 320/6; 320/15; 320/18
[58] Field of Search ............................. 320/6, 7, 15, 16, 320/18, 30, 32, 35, 39, 48, 46

[56] References Cited

U.S. PATENT DOCUMENTS

| | | | |
|---|---|---|---|
| 4,061,955 | 12/1977 | Thomas et al. | 320/18 X |
| 4,614,905 | 9/1986 | Petersson et al. | 320/18 |
| 5,206,578 | 4/1993 | Nor | 320/18 X |
| 5,387,857 | 2/1995 | Honda et al. | 320/18 |
| 5,438,250 | 8/1995 | Retzlaff | 320/17 |
| 5,498,950 | 3/1996 | Ouwerkerk | 320/18 |
| 5,504,415 | 4/1996 | Podrazhansky et al. | 320/18 |

FOREIGN PATENT DOCUMENTS 0277321  12/1987  Germany .

OTHER PUBLICATIONS

Abraham I. Pressman, "Flyback Converter Topologies", *Switching Power Supply Design*, McGraw–Hill, Inc., 1991, pp. 105–115.

*Primary Examiner*—Edward Tso
*Attorney, Agent, or Firm*—Koppel & Jacobs

[57] ABSTRACT

A safe, low-cost battery monitor and control system is presented. Electronic modules are connected to the terminals of respective batteries that make up a series string. Each module produces a go/no-go signal for each of four battery conditions: over-voltage, under-voltage, over-temperature and float-voltage, which are read by a network controller connected to each module via a single three-wire local area network. Based on the information received, the controller can adjust the charging current to the string, terminate the charge cycle, limit the current drawn from the string when in use, or disconnect the string from the system it is powering. The controller can record a history of the charge and discharge activity of each battery, so that the weakest batteries can be identified and replaced instead of scrapping the entire string. The system controls the charging current delivered to each battery during a charge cycle to insure that each battery is neither overcharged nor undercharged, by connecting a bypass circuit across the battery's terminals to reduce the charging current when an over-voltage condition is detected, or by reducing charge current to the string. A battery's voltage measurement is temperature compensated so that it can be accurately compared to temperature dependant limits. The addressable switch is bidirectional, so that the controller can, for example, force bypass resistors to be connected across selected batteries in order to heat up the batteries in a cold environment.

39 Claims, 6 Drawing Sheets

NETWORKED BATTERY MONITOR AND CONTROL SYSTEM AND CHARGING METHOD

BACKGROUND OF THE INVENTION

1. Field of the Invention

This invention relates to battery voltage monitors and charging controllers, particularly those used with a string of series-connected batteries.

2. Description of the Related Art

The use of series-connected rechargeable batteries for energy storage is increasing rapidly. Primary applications include telecommunications power supplies, uninterruptable power supplies, electric utility energy storage and the fast-growing electric vehicle industry. As their usage increases, so do the demands for longer life and easier, cheaper maintenance.

A number of batteries, each consisting of a modular assembly of one or more cells, are connected in series to form a "series string" to achieve a particular string voltage. A number of strings can be connected in parallel to form a "battery pack" to increase the amount of available discharge current. The batteries are usually interconnected both electrically and physically with rigid bus bars, and are charged by flowing a charging current into the string. How rechargeable batteries are charged and discharged can have a significant effect on their lifespan. For example, when valve-regulated lead-acid batteries (VRLA) are being charged, they often suffer a charge deficit that cumulatively increases with each charge. The amount of charge deficit varies from battery to battery—those with a smaller deficit are referred to as "more receptive" to charging current, and those with a large deficit are "less receptive". One way of compensating for a battery's charge deficit is to increase the voltage to which the battery is charged, i.e., the "float" voltage. When a battery's voltage reaches a manufacturer specified float-voltage, it is deemed fully charged. However, increasing the float-voltage to remedy the charge deficit of a less receptive battery can overcharge those batteries in the string that are more receptive. Overcharging causes disassociation of the electrolyte and consequent gas pressurization in a VRLA battery. If the pressure exceeds the relief valve setting, gas escapes and electrolyte is lost, with permanent loss of capacity as the result. The mismatch in charge receptivity grows with the number of charge cycles. When one battery in the string finally suffers an unacceptable loss of capacity, all of the batteries in the string must usually be discarded, even though many of them have substantial useful life remaining.

While overcharging is likely to occur to the more receptive batteries in the string, the less receptive batteries tend to become undercharged. To prevent overcharging, the charge voltage is kept below a limit which is less than the voltage needed to fully charge the less receptive batteries. Chronic undercharging causes sulfation which increases a battery's resistance; this further reduces the charge receptivity of the weaker batteries. When discharged by connecting a load to the string, the battery voltage of the undercharged batteries can reverse. This irreversibly damages the batteries, and can escalate into an explosion or fire if discharge continues.

Temperature must also be taken into account when charging a battery. When charging is near completion, a battery's voltage should be greater than a particular float-voltage limit and less than an over-voltage limit. These limits are typically specified by the manufacturer at a particular nominal temperature. Also specified is a temperature compensation factor that dictates how the float-voltage and over-voltage limits shift when the battery's temperature exceeds the nominal temperature. Thus, a battery cannot be optimally charged without accurately monitoring its temperature as well as its voltage.

One system devised for use with rechargeable batteries is described in U.S. Pat. No. 5,438,250 to Retzlaff. A length of conductor is connected from each battery terminal in a string to a complex relay switching network. Voltage monitoring circuitry and a floating power supply are sequentially connected to each battery. Since large potential differences are possible between conductors, and the batteries and conductors are often located in explosive areas, this approach can be dangerous. The large number of conductor cables required for a lengthy battery string also make the system prone to noise from nearby electrical or magnetic fields. Also, the system does not monitor the temperature of individual batteries; thus, a battery's float-voltage and over-voltage limits cannot be accurately temperature compensated.

An approach taken to solve the overcharging problem in the functionally similar case of monitoring and charging the individual cells that make up a single battery is described in U.S. Pat. No. 4,614,905 to Petersson et al. This patent discloses an autonomous linear shunt current regulator connected to an individual cell of a battery that prevents the cell's voltage from exceeding an over-voltage limit when charge current is flowed through the cell. If a cell's voltage exceeds a preset limit, a transistor and resistor connected across the cell are made to shunt an amount of current necessary to maintain the cell's voltage close to the limit. This approach is satisfactory unless the amount of shunt current needed to adequately reduce the cell's voltage exceeds the current limit of the regulator—the occurrence of this condition is not addressed. The device also fails to address the undercharging and voltage reversal problems, as the shunt current limitation may prevent the least receptive cells in a battery from being sufficiently charged before a charge cycle must be terminated to prevent a more receptive cell from exceeding the over-voltage limit. There is also no discussion of a system that can control the charge cycle for all cells in a battery or all batteries in a string.

E.P. 0 277 321 to Geuer, et. al., describes a system that monitors the voltage, current and temperature of individual batteries in a string by converting sensor values to a digital format that is then sent over a network to a central processor. The processor is burdened with extracting the essential information, i.e., the voltage, current, and temperature values with respect to prescribed limits, from vast amounts of raw data. This system only addresses the monitoring of batteries in a string, with no charging control capabilities. The overcharging, undercharging and cell reversal concerns described above are not addressed.

A system is needed that can safely, accurately and economically monitor the voltage and temperature status of each individual battery in a string, and can individually regulate the charge current to each battery.

SUMMARY OF THE INVENTION

A safe, low-cost battery monitor and control system is presented that solves each of the problems stated above.

Electronic modules are preferably mounted to the top or side of respective batteries that make up a series string and are connected to the battery's terminals. Each module produces a go/no-go signal for each of four battery conditions— over-voltage, under-voltage, over-temperature and float-voltage, which are read by a network controller connected to each module via a single three-wire local area network (LAN) cable. The controller addresses each battery's module in turn and reads its go/no-go signals to determine the battery's status, both while the batteries are in use (discharge mode) and while charging (charge mode). Based on the information received, the controller can adjust the charging current to the string, terminate the charge cycle, limit the current drawn from the string when in use, or disconnect the string from the system it is powering. The controller can also identify which batteries in the string are the least receptive, enabling the replacement of individual batteries instead of scrapping the entire string. The controller can record a history of the charge and discharge activity of each battery. Such a history can also help establish an optimum battery replacement schedule, and can reveal violations of warranty terms and conditions.

In addition to providing essential voltage and temperature status information about each battery, the individual modules also control the charging current delivered to each battery during a charge cycle to insure that each battery is neither overcharged nor undercharged. When a module detects that its battery is exceeding an over-voltage limit, a bypass circuit, which may consist of a resistor or a DC to DC converter, is connected across the battery's terminals to reduce the charging current through that battery. This unique charging method customizes the amount of charge current delivered to each battery while it is connected in a string, effectively converting the battery pack charger into individual chargers for each battery, so that each battery is brought within an optimal voltage range.

The four go/no-go signals produced by each module are preferably combined into one signal and connected to an addressable switch aboard the module which is connected to the LAN cable. To read the status of a particular battery, the network controller addresses the battery's addressable switch and reads its output. By observing the action of the switch output and knowing whether the battery is in the charge or discharge mode and, if in the charge mode, the battery's response to a change in charging current, the controller determines the state of the four go/no-go signals and responds appropriately.

The invention accurately measures the temperature of each battery with a sensor that is placed in contact with one of the battery's terminals and connected to a respective module. The sensor's output is used to temperature compensate the battery's voltage measurement and as an input to an over-temperature comparator.

The system can limit current drawn from the string or disconnect the string from the equipment it is powering if any battery has experienced an abnormally low voltage, or if hydrogen or excessive temperature are detected in the compartment containing the string.

The addressable switch is preferably bidirectional, so that the controller can command an action to occur on an addressed module. For example, the invention provides the capability to force bypass resistors to be connected across selected batteries in order to warm up the battery pack.

Further features and advantages of the invention will be apparent to those skilled in the art from the following detailed description, taken together with the accompanying drawings.

DETAILED DESCRIPTION OF THE INVENTION

Figure 1:
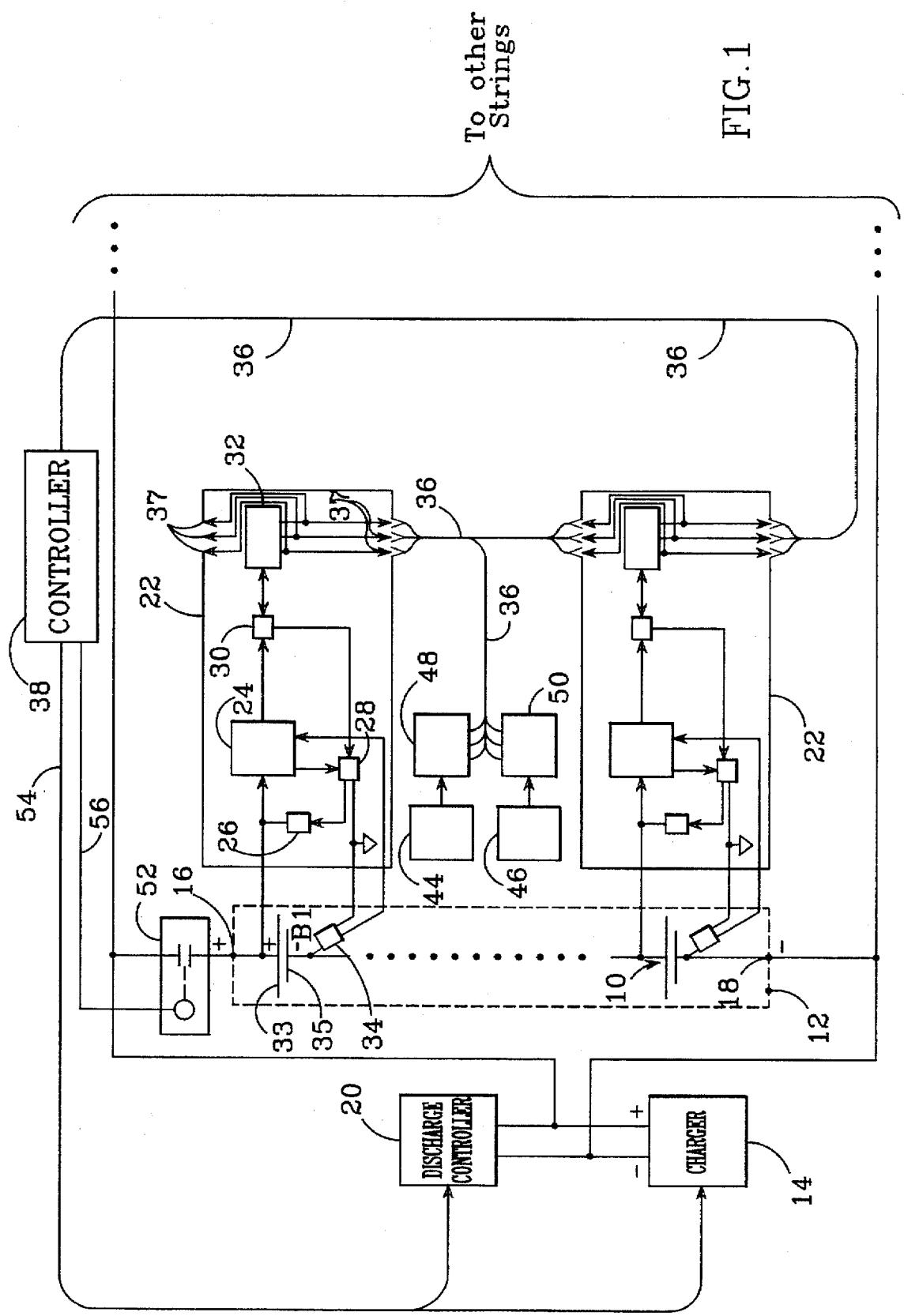
FIG. 1 is a block diagram of a networked battery monitor and control system per the present invention.

A networked battery monitor and control system is shown in FIG. 1. A number of batteries 10 are series-connected, typically with rigid metal busbars, to form a battery string 12. Additional strings may be connected in parallel with the first string. A battery pack charger 14 is connected to the positive terminal 16 and negative terminal 18 of the string, as is a discharge controller 20 which controls the application of power discharged from the strings. A string can contain any number of individual batteries; all the strings together form an energy store which can be used to power many types of electrical equipment. For example, four parallel strings of 28 batteries each make up a battery pack for an electric bus in which the discharge controller 20 is a traction inverter. A string is charged by an impressed current, which is typically supplied from a current regulated battery charger.

The terminals of each individual battery 10 are connected to a respective module 22, which includes electronic components preferably mounted on a printed circuit board which is mounted directly to the battery such that the busbars interconnecting the batteries are directly bolted to metallization traces on the board.

Each module 22 includes monitor circuitry 24, a bypass circuit 26, a bypass control circuit 28, electrical isolation circuitry 30, and at least one addressable switch 32, and is connected to a respective battery B1. B1's positive terminal 33 is connected to monitor circuitry 24 and to bypass circuit 26. A temperature sensor 34 is affixed to B1's negative terminal 35; the sensor's output is connected to the comparator circuitry 24, and the potential at B1's negative terminal is fed to the module through the sensor to provide a ground reference for the module electronics, which are powered by B1 itself.

The monitor circuitry 24 is used to compare the voltage and temperature of B1 with over-voltage, under-voltage, over-temperature and float-voltage limits recommended by the battery manufacturer. The monitor circuitry 24 produces four corresponding go/no-go output signals. These four signals provide the essential information needed to assess a battery's status.

Each module conveys the status of its respective battery over a single local area network cable 36 that connects to jacks 37 found on each module and to a network controller 38, which reads the status of each battery and takes appropriate action. Such action can include reducing the charging current to the string, disconnecting the string from the system, or limiting the current that can be drawn from the string.

A module uses a least one addressable switch 32 as its means of communicating its respective battery's status to the network controller 38. The four go/no-go signals from the monitor circuitry 24 are received as inputs to respective switches, or preferably, are combined in a particular way (described below) such that only one addressable switch is required for each module. When addressed by the network controller 38, the addressed switch places a go/no-go signal or combination of signals on the network cable 36 to be read by the network controller 38. By sequentially addressing each addressable switch in the system, the network controller acquires status information about each battery. Each addressable switch is preferably isolated from the battery string with electrical isolation circuitry 30, and is preferably bi-directional so that the network controller can cause an action to occur on an addressed module, such as engaging the module's bypass circuit to warm up the coldest batteries in the string during cold weather.

Other devices can be attached to the network cable 36 as well. For example, a hydrogen detector 44 and a temperature sensor 46 can be placed within a compartment containing the battery string 12, and be connected to the network cable 36 via respective addressable switches 48 and 50.

The controller 38 takes appropriate action by communicating with other devices in the system, such as the charger 14 and discharge controller 20. Communication from the controller 38 to these other devices is via an RS-232 or similar serial data bus over cable 54. The system also preferably includes a string contactor 52 that can disconnect the string from the charger and discharge controller upon a command from the controller 38 via a cable 56. For example, if the controller 38 detects a high temperature or a concentration of hydrogen in a compartment that is in excess of a predetermined limit, it can cause the string to be disconnected from the system by commanding contactor 52 to open via cable 56. Alternatively, the hydrogen detector may be connected directly to contactor 52, so that the string can be disconnected without the intervention of the controller 38.

Figure 2A:
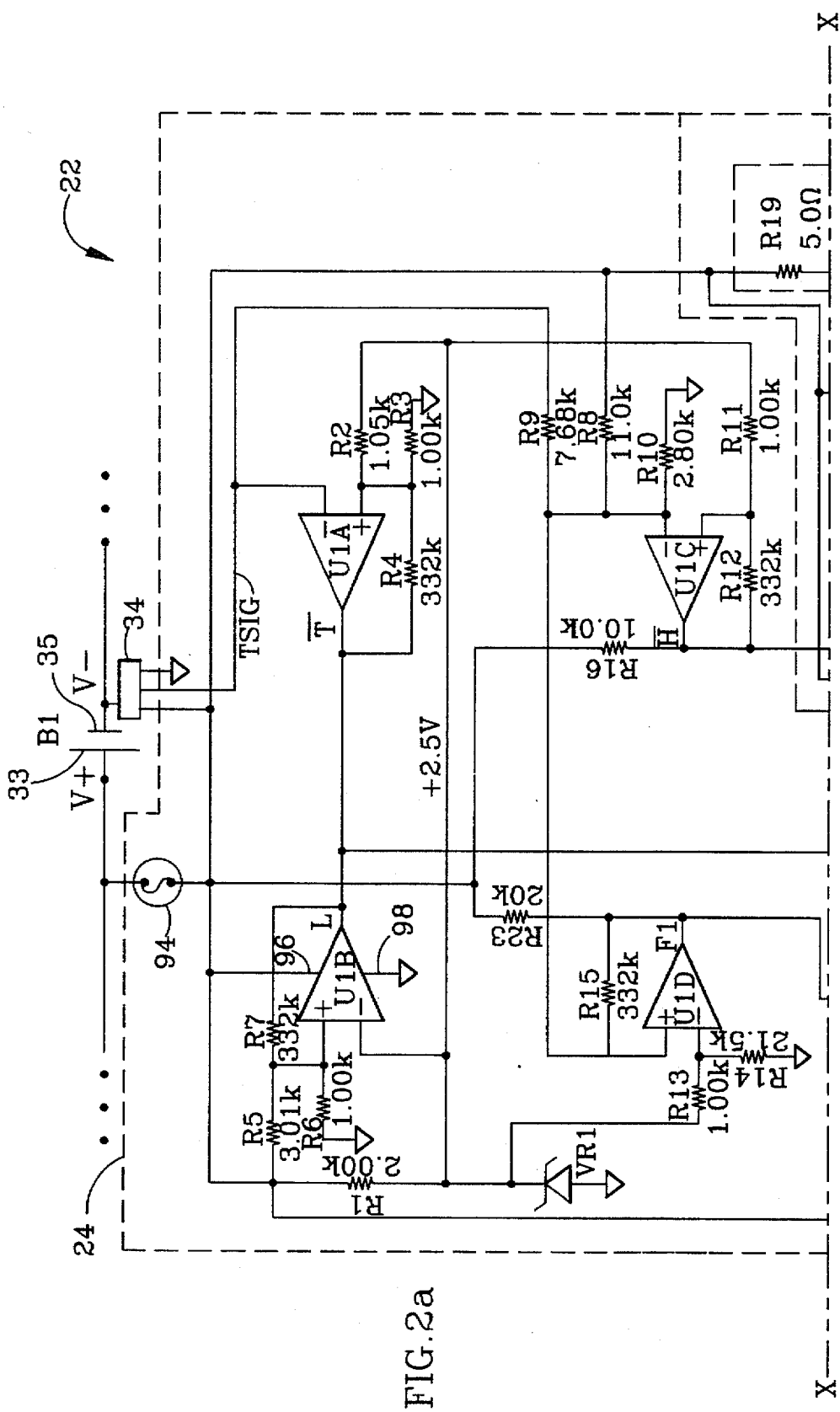
FIGS. 2a and 2b are a schematic diagram (divided into two halves by cut-line X) of a module that forms part of the system in FIG. 1.
Figure 2B:
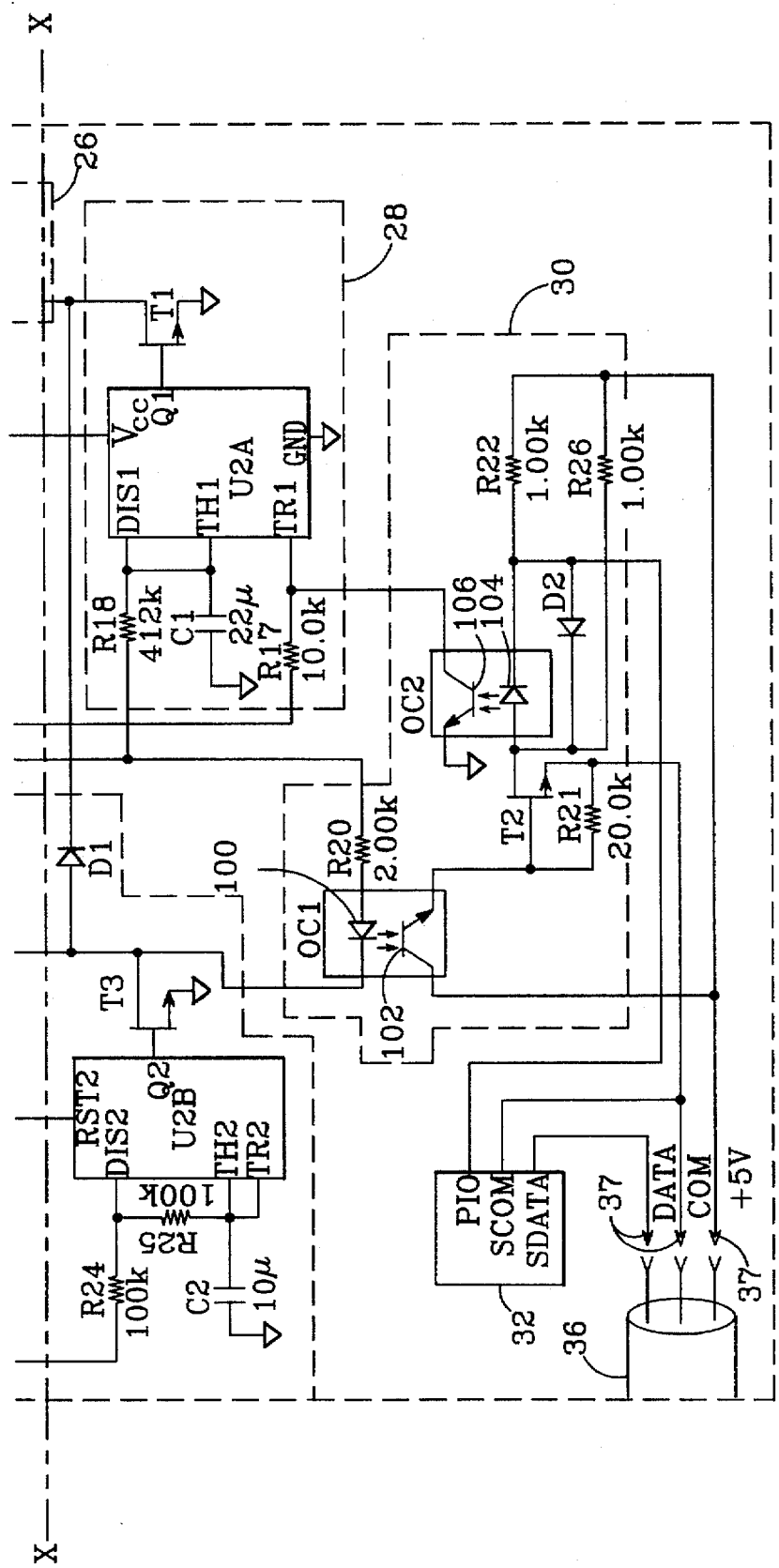

The heart of the networked battery monitor and control system is the module 22 mounted to each battery. A schematic diagram for a representative module is shown in FIG. 2. This module is connected to a respective battery B1. The component values used in module 22 and discussed below are selected for operation with a 6-cell 100 amp-hour VRLA battery. B1's positive terminal 33 is at positive voltage potential V+, and is connected to the module 22 through a fuse 94. Temperature sensor 34 is preferably in physical contact with the B1's s negative terminal 35, which is at potential V−. The preferred sensor has three leads: one lead brings the sensor's output signal TSIG onto the module, one lead is connected to V+ to power the sensor, and one lead brings V− onto the module to provide a ground reference for the module electronics. V− is represented with a signal common symbol in FIG. 2. The string's negative terminal 18 will be at a potential of zero volts, but the potential of the other negative terminals will be progressively higher as one moves up the string. The preferred temperature sensor is an LM34 from National Semiconductor which has a scale factor of 0.018 volt/degree C.+0.32 volts, and is largely immune to variations in its supply voltage.

The four go/no-go signals that establish the status of the battery are generated by the module's monitor circuitry 24, which includes four voltage comparators U1A, U1B, U1C and U1D, a precision voltage source VR1, and associated components. The anode of voltage source VR1 is connected to V+ via a resistor R1, typically 2.00 kΩ, and VR1's cathode is connected to V−. VR1 produces a highly stable 2.5 volt reference voltage $V_{ref}$. VR1 is preferably an LM385 from National Semiconductor. This reference voltage is used to generate the threshold voltages for the comparators. The comparators are contained in a single quad comparator chip which has its positive and negative power supply pins 96 and 98 connected to V+ and V− respectively. The LM239 quad comparator from National Semiconductor is a suitable device.

The over-temperature go/no-go signal is generated by comparator U1A. The inverting input of U1A is connected to the temperature sensor output TSIG. The non-inverting input of U1A receives a threshold voltage from a voltage divider consisting of resistors R2 and R3, which is fed by $V_{ref}$. The voltage divider resistors R2 and R3 are chosen to produce a comparator threshold voltage equal to the output voltage of the temperature sensor 34 at the over-temperature limit. Assume an over-temperature limit of 50 degrees C. This temperature would cause TSIG to be at (0.018×50)+0.32=1.22 volts. Neglecting the effect of a high resistance feedback resistor R4, an R2 value of 1.05 kΩ and an R3 value of 1.00 kΩ attenuate a $V_{ref}$ of 2.5 volts to produce a threshold voltage of 1.220 volts.

A high resistance feedback resistor R4, typically 332 kΩ, is connected between the output of U1A and its non-inverting input. Resistor R4, in conjunction with divider resistors R2 and R3, produces several millivolts of hysteresis in the comparator threshold voltage for the purpose of preventing spurious transitions in the comparator output when the slowly varying temperature signal crosses the comparator threshold. The open collector output of U1A, designated $\overline{T}$, changes to an active low (current sinking) state when TSIG exceeds the threshold voltage, i.e., when an over-temperature condition exists, and is a virtual open circuit when TSIG is less than the threshold. $\overline{T}$ is the over-temperature go/no-go signal, which goes low when the over-temperature limit is exceeded.

The under-voltage go/no-go signal is generated by amplifier U1B. The non-inverting input to U1B is connected to a voltage divider comprised of resistors R5 and R6, with the input to the divider connected to V+. The inverting input to U1B is connected directly to $V_{ref}$. Resistors R5 and R6 are selected to attenuate V+ to the level of $V_{ref}$ when V+ is equal to the under-voltage limit specified by the battery manufacturer. Neglecting the effect of high resistance feedback resistor R7, typical R5 and R6 values of 3.01 kΩ and 1.00 kΩ, respectively, produce an attenuated battery voltage signal equal to 0.2494×V+. Equating 0.2494×V+ to the 2.5 volt comparator reference voltage results in an under-voltage threshold of V+=10.03 volts, a level consistent with manufacturer's recommendations for the under-voltage limit for as six-cell VRLA battery. Positive feedback resistor R7, typically 332 kΩ, is connected between the output and the non-inverting input of U1B to prevent false output transitions. The output of U1B, designated $\overline{L}$, changes to an active low state when V+ falls below the under-voltage limit established with resistors R5 and R6, and is a virtual open circuit when V+ is above the under-voltage limit. $\overline{L}$ is the under-voltage go/no-go signal, which goes to an active low state when V+ drops below the under-voltage limit.

The over-voltage and float-voltage limits asserted by a battery manufacturer are typically specified at a particular battery temperature. To insure accurate operation, the invention therefore biases the attenuated battery voltage signal as a function of temperature prior to its being fed to the comparators that generate these two go/no-go signals. An attenuation network comprised of resistors R8, R9 and R10 provides the temperature compensation. Resistor R8 is connected to V+, R9 is connected to the temperature sensor output TSIG, and R10 is connected to V−. The other sides of these three resistors are connected together at a summing point. The voltage of TSIG increases with battery temperature; thus, for a constant V+, the voltage at the summing point will increase in accordance with battery temperature. As a result, an increase in battery temperature causes the outputs of the comparators using the compensated signal to change state at a lower battery voltage. Assume that the manufacturer of a six-cell VRLA battery specifies that the over-voltage and float-voltage limits are to be compensated at −24 mv/degree C. for each degree over 25 degrees C. This compensation is attained with values of R8, R9 and R10 of 11.0 kΩ, 7.68 kΩ and 2.80 kΩ, respectively. These values also serve to attenuate V+ to a level where it can be compared with a threshold voltage of 2.5 volts or less (example below).

The over-voltage go/no-go signal is generated by amplifier U1C, which has its inverting input connected to receive the temperature compensated V+ signal from the summing point formed by R8, R9 and R10. The non-inverting input of U1C is connected to $V_{ref}$ via resistor R11, typically 1.00 kΩ. A high resistance feedback resistor R12, typically 332 kΩ is connected between the output and non-inverting input of U1C. Resistors R11 and R12 provide sufficient hysteresis to prevent spurious transitions in U1C's output that might be caused by a slowly varying battery voltage signal at U1C's inverting input. The output of U1C, designated $\overline{H}$, changes to an active low state when the compensated V+ signal at its inverting input exceeds $V_{ref}$, i.e., when an over-voltage condition exists. $\overline{H}$ is the over-voltage go/no-go signal.

Assume an over-voltage limit of 15.0 volts, specified at a battery temperature of 25 degrees C., and a −24 my/degree C. compensation specification. If the battery temperature is 35 degrees C., the over-voltage limit is reduced to 15.0−(0.024×10)=14.76 volts. With the R8, R9 and R10 values suggested above, a V+ of 14.76 volts and a battery temperature of 35 degrees C. make the voltage at U1C's inverting input equal to 2.5 volts. Note that R8, R9 and R10 must be selected to provide the proper temperature compensation, as well as the proper attenuation with respect to the over-voltage threshold.

The float-voltage go/no-go signal is generated by amplifier U1D. The non-inverting input to U1D is connected to receive the same temperature compensated V+ signal used by the over-voltage comparator. However, the float-voltage limit is by definition less than the over-voltage limit; to achieve this, the threshold voltage connected to U1D must be less than that connected to U1C. Thus, U1D's inverting input is connected to a voltage divider comprised of resistors R13 and R14, which is fed by $V_{ref}$. R13 and R14 are selected to attenuate $V_{ref}$ in the same proportion that the float-voltage limit has to the over-voltage limit. For example, if the float-voltage limit is to be 95.6% of the over-voltage limit, U1D's threshold voltage should be 95.6% of $V_{ref}$. R13 value of 1.00 kΩ and an R14 value of 21.5 kΩ achieves an attenuation of about 95.6%.

A high resistance resistor R15, typically 332 kΩ, is connected between the output of U1D and its non-inverting input. R15, in conjunction with R8, R9 and R10, provides a few millivolts of hysteresis in the float-voltage signal to prevent false transitions in the comparator output. The output of U1D, designated F1, goes to an active low state when V+ is less than the float-voltage limit, and becomes a virtual open circuit when the limit is exceeded. F1 is the float-voltage go/no-go signal. When V+ is higher than the float-voltage limit, as indicated by F1 going high, the battery is considered fully charged. If all of the other batteries in the string have also reached float-voltage status, charging of the string may be terminated.

The output $\overline{H}$ of the over-voltage comparator U1C is connected to a pull-up resistor R16, typically 10.0 kΩ, with R16's other terminal connected to V+. $\overline{H}$ is also connected to a coupling resistor R17, typically 10.0 kΩ, with the other terminal of R17 connected to a trigger input TH1 of a timer integrated circuit U2A. The preferred timer is an industry-standard 556 dual timer.

Timer U2A is configured as a monostable multivibrator: a negative transition at TR1 to less that ⅓ of V+ causes an output Q1 of U2A to change from a logic "0" state to a logic "1" state, where it remains for a time-out period. The time-out period is determined by the values of a timing resistor R18 and a timing capacitor C1. One terminal of R18 is connected to V+ and one terminal of C1 is connected to V−, with the common node of R18 and C1 connected to the common connection of the discharge input DIS1 and the threshold input TR1 of U2A. The capacitance and resistance values of C1 and R18 are preferably selected to establish a time-out period for the Q1 output of about 10 seconds. This is accomplished with values for C1 and R18 of 22 μF and 412 kΩ, respectively.

The nature of the Q1 output signal differs from that of the $\overline{H}$ signal in the following way: the minimum duration of the logic "1" state of the Q1 signal is determined by the values of C1 and R18, whereas the duration of the logic "0" state of the $\overline{H}$ signal is determined by the time required for the battery voltage to fall below the over-voltage limit when the bypass resistor R19 is switched on. This period may be as short as a few milliseconds.

When the over-voltage limit is exceeded, $\overline{H}$ changes to an active low state, triggering the monostable to produce a logic "1" signal at the Q1 output terminal. Q1 is connected to the control input of a transistor T1, which is preferably a MOSFET device. U2A, R17, R18, C1 and T1 comprise a bypass control circuit 28. T1's drain is connected to one terminal of a bypass circuit 26 which preferably comprises a bypass resistor R19. T1's source is connected to V− and R19's other terminal is connected to V+.

T1 is used as a switch: when Q1 goes high, T1 is turned on, and bypass resistor R19 is effectively connected across the battery terminals. When in this state, the charging current flowing through the battery is reduced by an amount equal to the battery voltage divided by the bypass resistance, i.e., the bypass current. If the bypass current is of sufficient magnitude, the charging current still flowing through the battery will be unable to sustain the battery voltage, which will quickly drop below the over-voltage limit. If this happens, $\overline{H}$ goes high and T1 is switched off when U2A times out. If the bypass current does not sufficiently decrease the battery charging current, the battery voltage will continue to increase even with the bypass resistor R19 connected; in this case, $\overline{H}$ remains at logic "0" and the trigger signal at the input of U2A remains at less than ⅓ of V+. Because of the internal circuitry of the 556 type timer, this trigger voltage condition results in a continuous logic "1" at U2A's Q1 output. This in turn causes continuous conduction of the transistor T1 so that bypass resistor R19 remains continuously connected across the battery terminals.

For the situation described above where the current in the bypass resistor R19 is insufficient to prevent an increase in the battery terminal voltage above the over-voltage threshold, the controller must reduce the charging current being delivered to the string to prevent the over-voltage related problems discussed above. The means by which the controller is made aware of a persistent over-voltage condition is described below.

When the battery voltage has not fallen under the over-voltage limit with the bypass resistor engaged for 10 seconds, the network controller 38 takes further action by reducing the charging current delivered to the battery string 12 by charger 14. The over-voltage go/no-go signal is communicated to the network controller via an addressable switch 32. The addressable switch is bidirectional, and has three terminals: a programmable input/output pin PIO, a data pin SDATA, and a common pin SCOM. The local area network (LAN) cable 36 connects to each switch via jacks 37 on the module, and has three wires: a LAN power supply voltage of +5 volts is carried on one wire +5 V, one wire is the LAN network's common line COM, and one wire DATA carries data between the network controller 38 and the switches. The SDATA and SCOM pins of each switch are connected to the DATA wire and COM wire, respectively, of the network cable 36. Power from the cable's +5 V wire is also used in each module, as described below. Each switch has a unique address. The network controller 38 addresses a switch by placing its address onto the DATA line. The controller also sends a READ DATA or WRITE DATA command to the addressed switch to place it into the corresponding mode. If a READ DATA command is sent, the addressed switch impresses the logic value present at its PIO pin onto the network's DATA line; if a WRITE DATA command of logic "0" is sent, the addressed switch forces the PIO pin to an active low state.

To insure the independence of each module, the LAN is electrically isolated from module circuitry that is connected to the batteries. The invention operates so that the only signals that need bridge this isolation barrier are the four go/no-go signals related to each battery, rather than the actual voltage and temperature data streams of past designs. The invention goes further in that the four go/no-go signals are innovatively combined into a single signal. Electrical isolation circuitry 30 preferably includes optocouplers OC1 and OC2, and associated components needed to provide data to or receive data from the addressable switch 32. Optocouplers preferably provide the bridge between the comparator outputs and the addressable switches. By virtue of the combining of the essential battery status signals into one signal (discussed in detail below), only one optocoupler and one addressable switch are needed per module to communicate each battery's health to the network controller. This results in a low-cost, low parts count, reliable module that is cost-effectively mounted to each battery in a string.

An optocoupler OC1 contains a photodiode 100 and a phototransistor 102. When current flows through the photodiode, photon energy is emitted which turns on the phototransistor. The over-voltage go/no-go signal crosses the isolation barrier as follows: the drain of MOSFET T1 is connected to the cathode of a diode D1. The anode of D1 is connected to the cathode of the photodiode 100. The anode of photodiode 100 is connected to a current limiting resistor R20, preferably 2.00 kΩ, with the other terminal of R20 connected to V+. When T1 is turned on by the occurrence of an over-voltage condition, a current flows from V+, through resistor R20, photodiode 100 and diode D1 to the drain of T1. The current flow through the photodiode 100 turns on phototransistor 102.

The collector of phototransistor 102 is connected to the +5 V line of the LAN cable, and its emitter is connected to the control input of a transistor T2 and to a resistor R21, typically 20.0 kΩ. The other terminal of R21 is connected to the source of T2, which is also connected to the COM line of the LAN cable 36. T2's drain is connected to the cathode of a diode D2, with D2's anode connected to a resistor R22, typically 1.00 kΩ. The other terminal of R22 is connected to the +5 V line of the LAN cable 36. When phototransistor 102 is turned on by the occurrence of an over-voltage condition, the resistor R21 between T2's gate and source causes a voltage to be applied to the gate of T2 sufficient to turn T2 on. With T2 on, current flows from the +5 V line of the LAN cable, through resistor R22, diode D2, and through T2 to the LAN's COM line. The anode of diode D2 is connected to the PIO pin of the addressable switch 32. When current flows through D2, as occurs when monostable U2A has been triggered by an over-voltage condition, the PIO pin is brought to a logic "0" state due to the small voltage drops of diode D2 and the drain source channel of MOSFET T2. In this way, an over-voltage condition is communicated across the isolation barrier to an addressable switch. When the switch's address and a READ DATA command appear on the LAN cable's DATA line, the switch responds by impressing the logic "0" at its PIO pin onto the LAN's DATA line. The network controller 38 reads the logic level and takes appropriate action. The action taken is dependant on the controller's programming. When the controller 38 determines that a particular battery has been in an over-voltage condition for over 10 seconds, it commands the charger 14 to reduce the charging current to the string containing that battery.

The over-temperature go/no-go signal $\overline{T}$ is similarly communicated to the addressable switch via optocoupler OC1. The output $\overline{T}$ of the over-temperature comparator U1A is connected to the cathode of OC1's photodiode 100. When an over-temperature condition occurs, $\overline{T}$ goes to an active low state, allowing current to flow from V+ through resistor R20, photodiode 100, and through an output transistor within amplifier U1A to V−. Current flowing through photodiode 100 causes phototransistor 102 to turn on, which, as described above, causes the PIO pin of switch 32 to be at a logic "0"; this logic state is read by the controller 38 when switch 32 is addressed.

Under-voltage go/no-go signal L works exactly the same way. The output L of under-voltage comparator U1B is also connected to the cathode of photodiode 100. The output L goes low when V+ drops below the under-voltage limit, allowing current to flow through the photodiode 100, turning on phototransistor 102 and making the PIO pin of switch 32 a logic "0".

The float-voltage go/no-go signal F1 is preferably communicated to the addressable switch 32 in a different way to allow the controller to discriminate between a float-voltage go/no-go signal and a go/no-go signal representing over-voltage, over-temperature, or under-voltage. The output F1 of float-voltage comparator U1D is connected to a pull-up resistor R23, preferably 20.0 kΩ, with the other terminal of R23 connected to V+. F1 is also connected to a reset input RST2 of a timer integrated circuit U2B, preferably the other half (with U2A) of a 556 dual timer I.C. U2B is configured as an astable multivibrator. A timing resistor R24, preferably 49.9 kΩ, is connected between V+ and a discharge input DIS2 of U2B. A second timing resistor R25, preferably 100 kΩ, is connected between the DIS2 input and the threshold input TH2 of U2B, and a timing capacitor C2, preferably 10 μF, is connected between TH2 and V−. U2B's trigger input TR2 is connected to TH2. These components cause the multivibrator to produce a frequency at an output Q2 of about 0.5 Hz, with a duty cycle of about 67% low, 33% high, when the RST2 input is at a logic "1" level; Q2 is held at logic "0" when RST2 is at logic "0". When V+ is over the float-voltage limit, F1 goes to logic "1", allowing Q2 to toggle at about 0.5 Hz. Q2 is referred to as the toggling float-voltage go/no-go signal.

U2B's output Q2 is connected to the control input of a transistor T3 with the source of T3 connected to V− and the drain connected to the cathode of photodiode 100. When Q2 is toggling, T3 is switched on and off. When T3 is switched on, a current path is created from V+, through R20, photodiode 100 and T3 to V−. As described above, a current flowing through photodiode 100 turns on phototransistor 102, which results in a logic "0" at the addressable switch's PIO pin. When T3 is switched off, the current path is broken and PIO goes to logic "1". Thus, PIO is toggled in accordance with Q2 when V+ is higher than the float-voltage limit.

As described above, the PIO pin of a particular switch can assume one of these possible states:

PIO can be fixed at logic "0", indicating an over-temperature condition.

PIO can be fixed at logic "0", indicating an over-voltage condition.

PIO can be fixed at logic "0", indicating an under-voltage condition.

PIO can be fixed at logic "1", indicating that the battery voltage is above the under-voltage limit and below the float-voltage limit, and that no over-temperature condition exists.

PIO can be toggling at about 0.5 Hz, indicating the battery voltage is over the float-voltage limit, but less than the over-voltage limit and that no over-temperature condition exists.

The controller is programmed to discriminate between these possible states and to take appropriate action. Proper interpretation and action depend on whether the system is in a charge mode, with the charger supplying current to the batteries, or in a discharge mode, with the batteries providing power to a load. The controller is informed of the system charge/discharge status by means of signals received from the charger 14 and the discharge controller 20 over the RS-232 serial data bus 54 shown in FIG. 1.

If the PIO pin is at logic "0" and the system is in the charge mode, one or more of the following conditions exist: 1) the battery temperature exceeds the over-temperature limit, 2) the battery voltage exceeds the over-voltage limit, and/or 3) the battery voltage is less than the under-voltage limit (due to one or more shorted cells). If the logic "0" fault indication at the PIO pin persists for more than 10 seconds, meaning that switching the bypass circuit across the battery's terminals did not clear an over-voltage fault condition, the controller commands a reduction in the string charging current. If the reduction in charging current does not immediately cause the PIO logic state to revert to a logic "1", then the fault is caused either by over-temperature or under-voltage. In this case the controller reduces the charging current to zero. If zero charging current does not clear the fault in a prescribed time period (typically five minutes), then the fault is caused by under-voltage which is symptomatic of one or more shorted cells. In this case, the charging process is terminated and the defective battery is replaced.

Observing the reaction to a reduced charging current is the preferred technique to discriminate between otherwise identical go/no-go signals. Other techniques may be employed as well. For example, circuitry could be added to cause one of the go/no-go signals to toggle with a particular known duty cycle as a signature. By detecting that the PIO output matches the signature, the actual condition can be pinpointed. This technique may provide a higher degree of certainty in the interpretation of a module's PIO pin output, but comes at the expense of a higher parts count and cost per module.

If a battery has reached the float-voltage, its PIO signal will toggle at 0.5 Hz. When all the batteries in a string have reached their float-voltage as indicated by the presence of a 0.5 Hz signal at each respective PIO pin, the charge cycle is complete for that string. If the battery pack only has one string, the controller commands that the charger 14 be turned off.

If the battery pack comprises more than one string, however, a string becoming fully charged causes the controller 38 to command that the string's contactor 52 disconnect the string from the system. This is necessary because a battery that is near full charge will cause its bypass circuit to be engaged a high percentage of the time, while it waits for less receptive batteries to become fully charged. If most of the initial bypassing during a charge cycle happens to take place with batteries in the same string, the current in that string's bypass circuits will increase the current drawn by that string. Since the charger is current regulated, the current in the other strings must decrease. The result is that the current in the string being bypassed "hogs" the charging current, thus depriving the other strings of the current necessary to bring them to full charge. By disconnecting a string upon its becoming fully charged, the charging current is directed into the other strings so that they may become fully charged as well. The charge cycle is completed when the last string is disconnected from the charger.

One condition that the controller is programmed to detect is that of a battery with an abnormally high internal series resistance, which can be caused by being chronically undercharged so that sulfation has occurred, or if a battery's voltage has been reversed. A battery in this condition will exceed its over-voltage limit very quickly, typically during the initial phase of a charge cycle. The controller will recognize that the over-voltage limit was reached prematurely and will interpret this as evidence that the battery is defective. The controller will then terminate the charge cycle and cause a message or warning to be given identifying the problem and the location of the defective battery.

A battery with a low capacity caused by abnormally low shunt resistance in one or more cells will require an abnormally long period to reach the float-voltage limit, and this time will increase with successive charge cycles. The controller tracks the time-to-reach-float-voltage time for each battery, and when an excessive time is noted for a particular battery, displays a warning to replace the battery.

When the system is in a discharge mode, an over-voltage condition or float-voltage limit indication is not possible. Therefore, if a PIO pin is at a logic "0" during discharge, it can only mean that an under-voltage or an over-temperature condition exists. The controller responds by commanding the discharge controller 20 to reduce the amount of battery current it is drawing. If an under-voltage condition is present, this action should immediately clear the fault. If it does not, an over-temperature condition is assumed, and the controller responds by opening the contactor 52 to disconnect the string containing the overheated battery from the system. The controller 38 will also disconnect the string by opening the contactor 52 if the amount of current reduction required to clear the fault is too large to permit operation of the equipment powered by the system.

Figure 3:
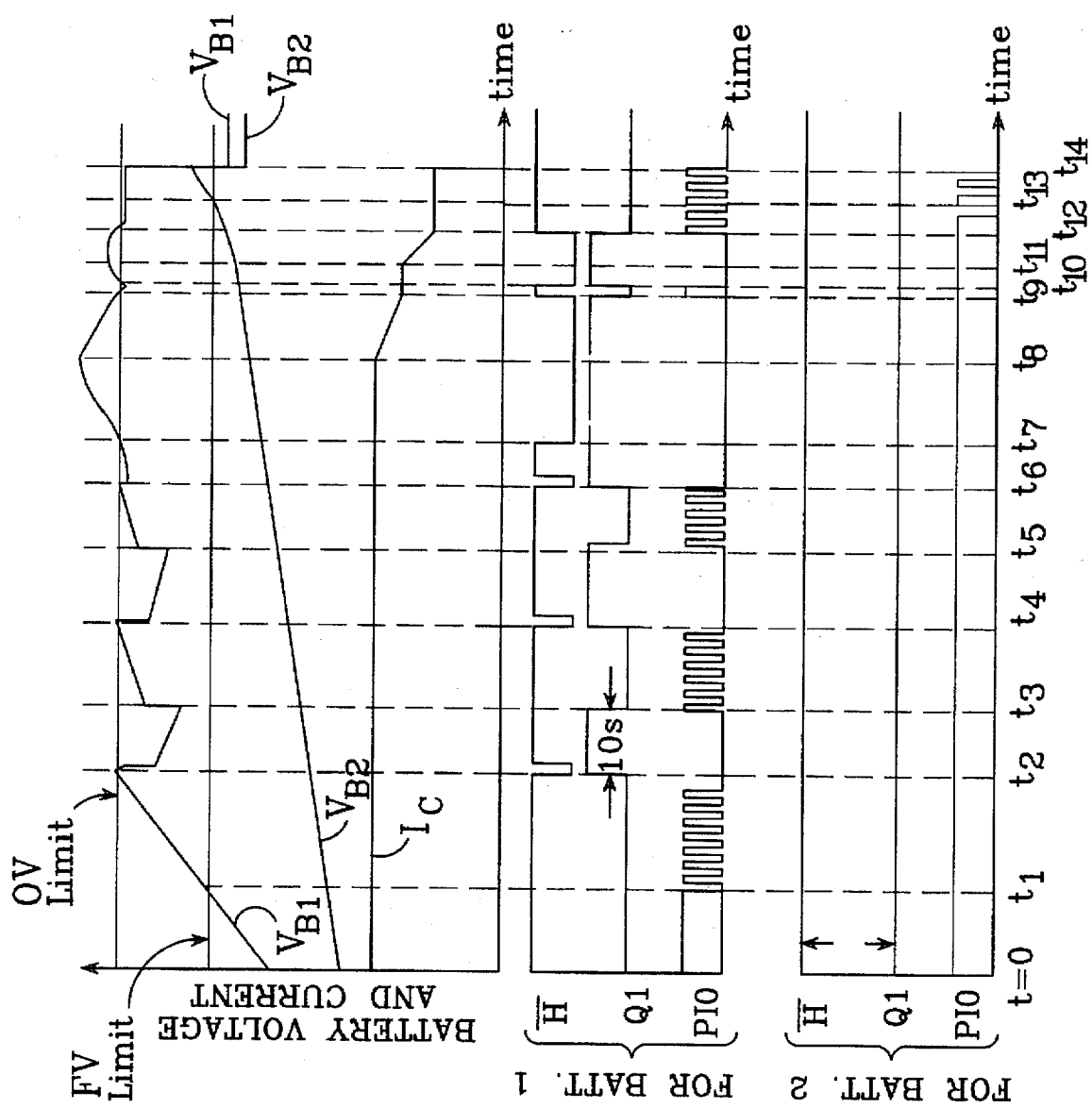
FIG. 3 is a graph depicting a charging sequence per the present invention.

A typical sequence of events for charging a two battery string per the present invention is shown in FIG. 3, to illustrate how batteries of differing charge receptivity are brought to approximately equal final float-voltages. Each battery has a respective module containing the circuit of FIG. 2, with each module's key logic signals shown in FIG. 3. One battery BATT. 1 has a greater initial state-of-charge, and has a battery voltage $V_{B1}$. The second battery BATT. 2 has a voltage $V_{B2}$. The events proceed as follows:

| Time | Event |
|---|---|
| $t_0$ | Charger 14 is commanded to start a charge cycle. Charging current $I_c$ is constant at a level determined by the current rating of the charger or the battery manufacturer's recommended maximum charging current. |
| $t = t_1$ | $V_{B1}$ reaches the float-voltage (FV) limit, causing the float-voltage go/no-go signal F1 to go high, enabling the astable, and causing the PIO terminal to toggle at 0.5 Hz. |
| $t = t_2$ | $V_{B1}$ reaches the over-voltage (OV) limit, causing the over-voltage go/no-go signal $\bar{H}$ on BATT. 1's module to go low, triggering the monostable and connecting the bypass circuit across BATT. 1's terminals. This causes $V_{B1}$ to decrease almost immediately, followed by a negative slope ramp as the charge current in BATT. 1 is reduced by the current in the by-pass circuit. PIO goes low at $t = t_2$ and remains low for the 10 second monostable time-out period. Since $V_{B1}$ remains above the FV limit, PIO toggles at 0.5 Hz after the monostable times out. $V_{B2}$ is well below the FV limit (but above the under-voltage limit); BATT. 2's $\bar{H}$ signal is thus held high, its monostable output Q1 stays low, and its PIO pin is held high. |
| $t = t_3$ | BATT. 1's monostable times-out, Q1 falls, disconnecting the bypass circuit, and $V_{B1}$ starts to increase again. PIO toggles at 0.5 Hz because $V_{B1}$ exceeds the FV limit. |
| $t = t_4$ | $V_{B1}$ exceeds the OV limit again. The bypass circuit is switched in and the battery voltage repeats the down step-and-ramp as described above at $t = t_2$. The slope of the negative ramp is reduced because the battery is now more fully charged. |
| $t = t_5$ | The 10 second monostable time-out period ends and $V_{B1}$ starts to increase again. |
| $t = t_6$ | $V_{B1}$ again reaches the OV limit. The monostable begins its time-out and the bypass resistor is switched in. However, BATT. 1 is now close to full charge, so that $V_{B1}$ continues to increase after an initial negative step even with bypass current flowing. |
| $t = t_7$ | $V_{B1}$ reaches the OV limit again before the monostable has timed-out from the previous over-voltage occurrence at $t_6$. $\bar{H}$ remains low and Q1 remains high, causing the bypass circuit to be continuously connected to the battery. PIO is held low as the OV limit continues to be exceeded. |
| $t = t_8$ | The controller detects that $V_{B1}$ has remained above the OV limit and responds by reducing the charging current $I_c$. $V_{B1}$ starts to fall. |
| $t = t_9$ | $V_{B1}$ falls below the OV limit. The controller detects this and holds $I_c$ constant at a first reduced current level. The monostable times out and the bypass resistor is disconnected. |
| $t = t_{10}$ | After a short delay, $V_{B1}$ again rises above the FV limit and $\bar{H}$ again goes to logic "0". $\bar{H}$ remains at logic "0" because the first reduced constant charging current is not low enough to keep $V_{B1}$ below the OV limit. |
| $t = t_{11}$ | The controller responds to the extended duration of an over-voltage condition by again ramping down the charging current $I_c$. $V_{B1}$ starts to fall. |
| $t = t_{12}$ | $V_{B1}$ falls below the OV limit, and the controller holds $I_c$ constant at a second reduced current level. BATT. 1's PIO pin is toggling at 0.5 Hz because $V_{B1}$ is above its FV limit but below its OV limit. |
| $t = t_{13}$ | BATT. 2's voltage $V_{B2}$ finally reaches its float-voltage limit. Its PIO signal starts to toggle. |
| $t = t_{14}$ | The controller detects that the PIO pin of each battery in the string is toggling at 0.5 Hz, meaning that all batteries have reached the FV limit. The controller shuts down the charger. $V_{B1}$ and $V_{B2}$ step down to their respective open circuit voltages. |

By adjusting the charging current passing through a battery as a function of that battery's voltage and temperature, this charging method essentially provides an individual charger for each battery in the system. The system tailors the charge cycle experienced by each individual battery to suit that battery's own particular characteristics, enabling each to reach its float-voltage without incurring problems due to persistent over-voltage, chronic under-voltage, or over-temperature conditions.

Using a microprocessor as a network controller enables the system to track the charging and discharging history of each battery in the system by recording the state of each go/no-go signal that is read when a switch is addressed. Analysis of this information can provide the following benefits:

The weakest battery in a string is identified by determining which battery was the last to reach its float-voltage.

The string can be repaired by replacing individual batteries instead of scrapping the entire string when one battery becomes defective.

An optimum battery replacement schedule can be established.

Violations of warranty terms and conditions can be determined.

The controller continuously cycles through each addressable switch in the system in a particular order, so that there is a fixed time interval between interrogations of a particular switch. The time interval is dependant on the number of switches in the system, the maximum data rate of the LAN, the speed of the controller used, and the amount of processing that must be done by the controller. Assume a battery system has two parallel strings of 28 batteries each, with each battery having a respective module with one addressable switch. Further assume that the controller can interrogate 150 switches per second. Thus, each of the 56 switches in the battery pack is interrogated approximately once every 373 ms. The preferred network controller is the 8752 8-bit microprocessor from Intel, Corp., which provides the interrogation rate given in the above example. However, because a battery's condition changes slowly, high speed performance is not required, and a slower controller will not significantly affect performance for a system of the size given above. Note that a battery pack charger used in conjunction with the system often has its own control computer. For applications in which the battery pack and pack charger are to remain in close proximity, such as an uninterruptable power supply, the network controller functions may be combined with the charger control functions in one computer. This is also an option in an electric vehicle equipped with an on-board charger.

The invention preferably uses only one addressable switch per module. This reduces the parts count for each module, but increases the demands on the network controller to discriminate between the various possible signals that are read. An alternative is to use one addressable switch for each go/no-go signal on the module. This would eliminate the need to use the controller's programming to discriminate between battery status signals. However, this approach requires additional switches and optocouplers on each module.

Though the preferred embodiment uses four go/no-go signals to provide a battery's status, the invention is equally applicable to a system using more or less go/no-go signals. For batteries built with current technology, it is recommended that, at a minimum, the four parameters described above be monitored, as each provides information essential to the preservation of a battery's cycle life. Monitoring of additional parameters is easily provided for by adding more addressable switches and optocouplers, or by combining more signals together using techniques such as the 0.5 Hz toggling signal used for the float-voltage limit described above.

The invention is not limited to the signal combining techniques described above—there are a virtually unlimited number of ways in which a signal could be generated so that it can be distinguished from other signals. For example, go/no-go signals can be made to toggle at different frequencies, like the float-voltage signal, or with different duty cycles. Note that the sampling rate of the controller must be high enough to be able to detect the distinguishing feature of each signal. For example, if the controller only interrogates a particular switch once every 2 seconds, it will be impossible for it to distinguish a signal toggling at 20 Hz.

The invention is applicable to a string having any number of batteries connected in series, and to a system having any number of strings in parallel. As described above, the time interval between interrogations should be considered as the number of batteries and addressable switches grows.

If a bypass resistor such as R19 is used as a bypass circuit 26, the resistance value of the bypass resistor establishes the amount by which the charging current can be reduced through an individual battery. In this way, the value of R19 indirectly determines the string's charging time, i.e., the time required to bring the least receptive battery in the string to full charge. A bypass resistance of about 5Ω is a reasonable value for a 100 ampere-hour 6-cell battery. The bypass resistor must be able to handle the power it is being called upon to dissipate. If the battery it is connected across is at 14 volts, a 5Ω resistor will need to handle about 39 watts.

The module circuitry is preferably mounted on a printed circuit board that is in turn attached to the terminals of a respective battery. The preferred implementation of bypass resistor R19 uses a copper trace on the board having a width, depth and length necessary to provide the desired resistance value, i.e., a "distributed" resistor. A resistance of about 5Ω is obtained with a copper trace length, width and thickness of 500 cm, 0.05 cm and 0.0035 cm respectively.

Figure 4A:
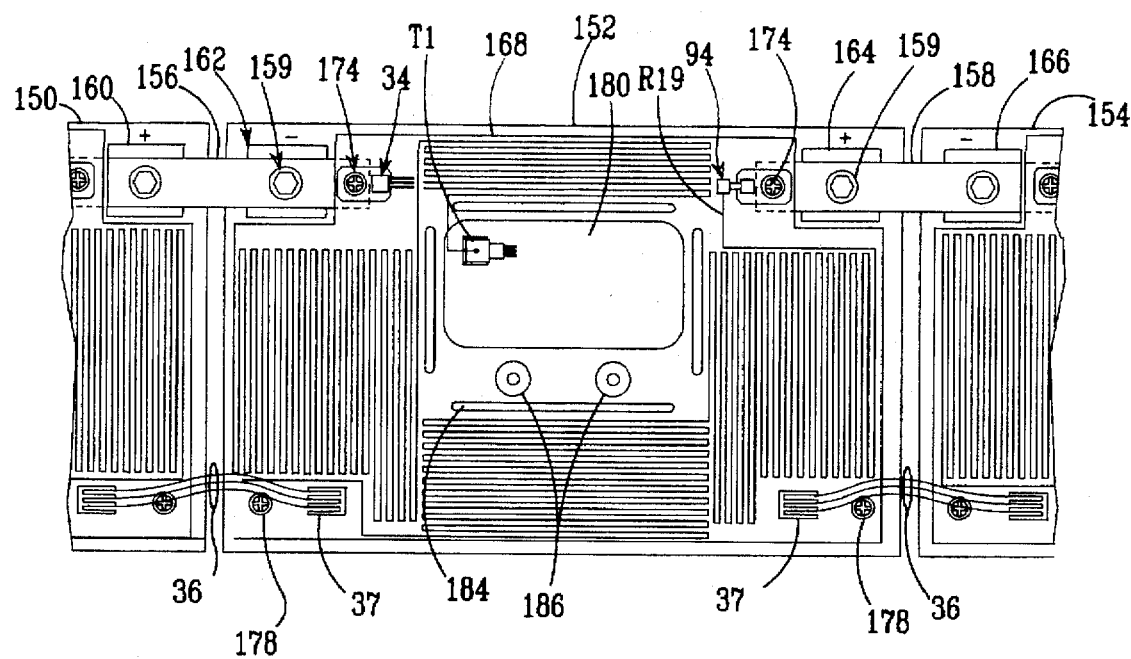
FIGS. 4a and 4b are a plan view and elevation view, respectively, of an embodiment of the present invention.
Figure 4B:
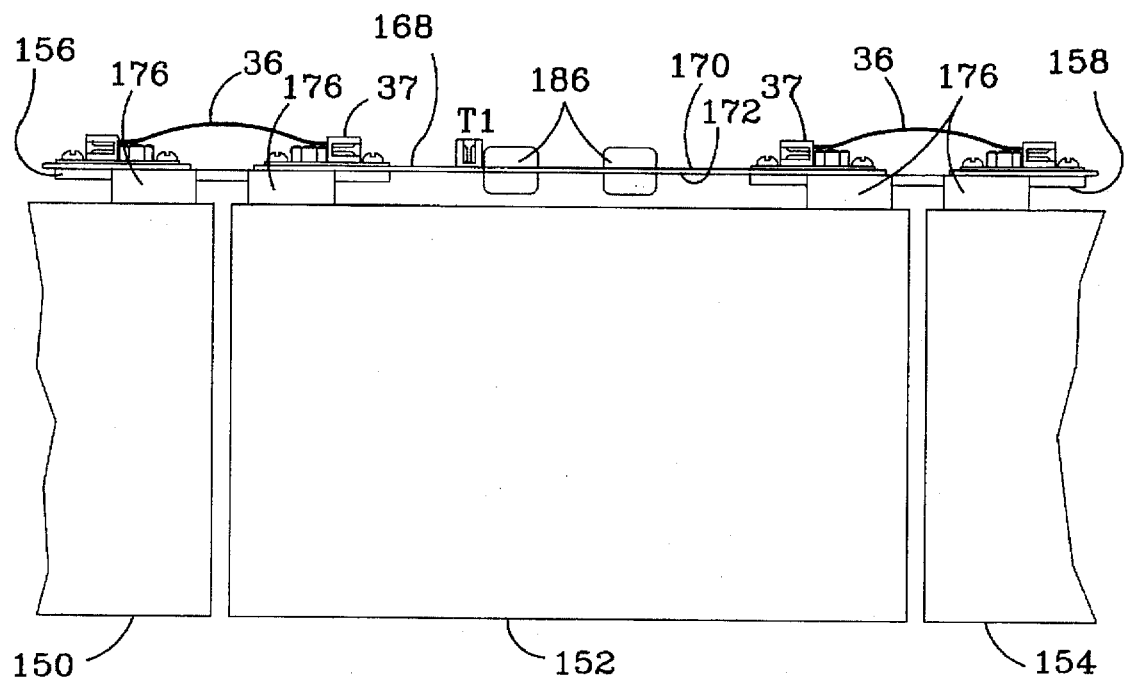

A circuit board using a distributed bypass resistor is shown in FIGS. 4a and 4b. Three batteries 150, 152, 154 of a multi-battery string are shown. The batteries are preferably interconnected using two rigid copper busbars 156, 158 that are secured to the top mounted battery terminals with bolts 159, with one busbar 156 connecting the positive terminal 160 of battery 150 to the negative terminal 162 of battery 152, and one busbar 158 connecting the positive terminal 164 of battery 152 to the negative terminal 166 of battery 154.

The circuitry of each battery's respective module is preferably mounted on a circuit board 168 having a component side 170 and a circuit side 172. The board is essentially rectangular and has an area somewhat less than hat of the surface of the battery to which it is mounted so that the board does not extend beyond the sides of its respective battery. The busbars 156, 158 preferably extend past their respective terminals and toward the center of the battery 152, and two corners of circuit board 168 are supported by the busbars. The battery potentials V+ and V− are connected to the circuit board via the busbars, which contact copper pads on the circuit side 172 of the circuit board 168, and are secured to the board with screws 174 that pass through the board via plated-through holes. The screw 174 holding busbar 156 to the negative terminal 162 also serves to secure the temperature sensor to the component side 170 of the board 168, and to bring the sensor into thermal and electrical contact with negative terminal 162. The close proximity of the temperature sensor 34 to the negative battery terminal 162 allows it to accurately sense the temperature of the battery 152. The other two corners of circuit board 168 are preferably supported by threaded plastic blocks 176 that are attached to the battery surface with a suitable adhesive, and are attached to the board 168 with screws 178.

Module components are mostly concentrated in an area 180 of the board 168 near the center of the component side 170, and the area 180 is surrounded by the distributed bypass resistor R19. The circuit board trace of resistor R19 is on the component side 170, starting at fuse 94 and terminating at transistor T1. The temperature sensor 34 connections are carried through plated-through holes to the circuit side 172 of the board 168, and continue to the module component area 180 via traces on that side to avoid interference with bypass resistor R19.

The LAN cable 36 interconnecting each module is preferably comprised of short lengths of three-conductor cable that connect to each board 168 via a pair of three-terminal jacks 37. The two lacks 37 are connected to each other and to the module component area 180 by way of traces on the circuit side 170 of the board, to avoid interference with bypass resistor R19.

The module component area 180 is surrounded by ventilation slots 184, to release heated air from the space between the top of the battery 152 and the circuit board 168. The slots also isolate the heat released by the distributed bypass resistor R19 from the module circuitry.

Grommets 186 are preferably pressed into holes in the circuit board 168 and centered over the battery's pressure release valve orifices. Gasses released by the valves will vent through the grommets and will not become trapped between the battery 152 and circuit board 168.

Figure 5:
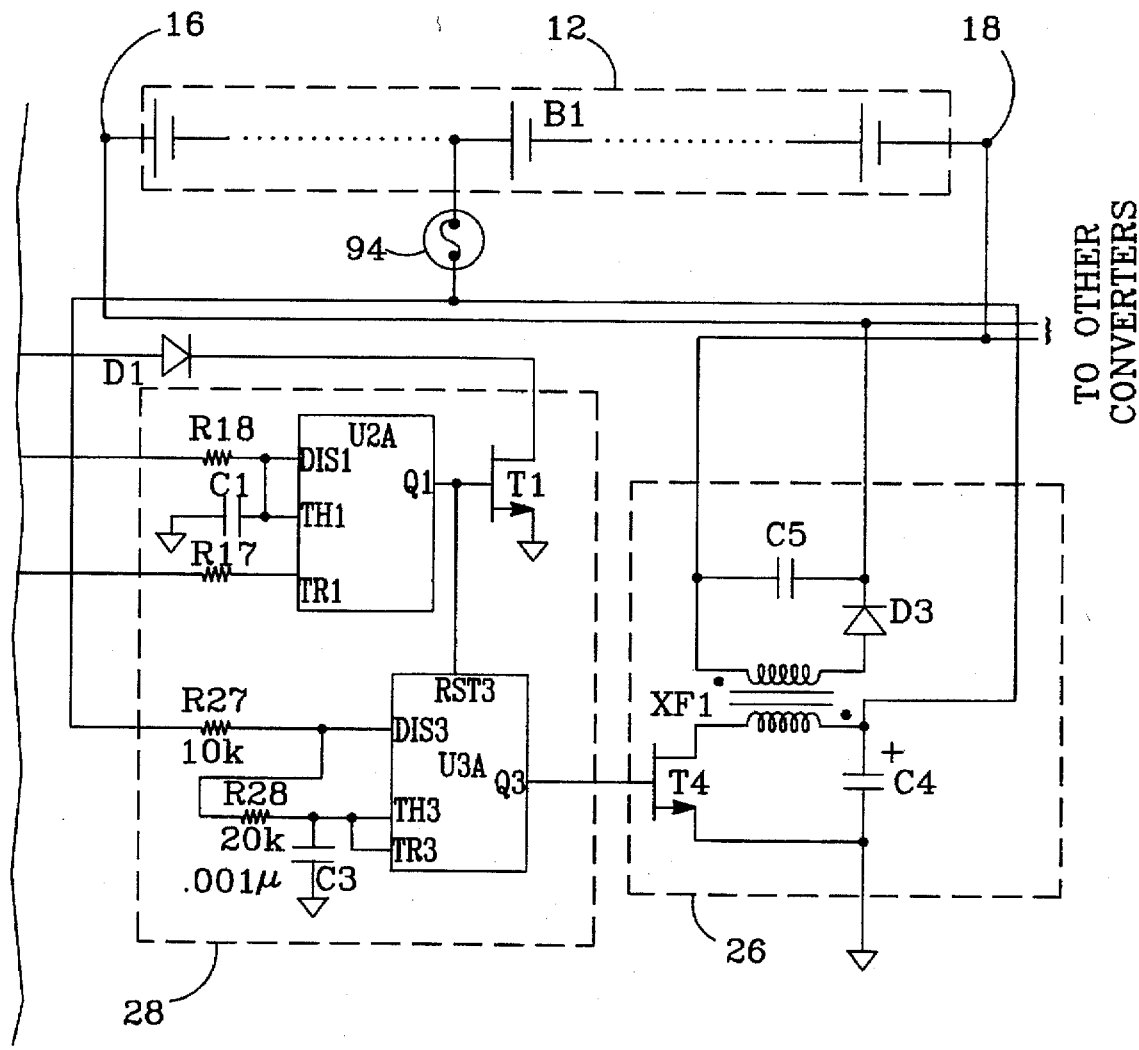
FIG. 5 is a schematic diagram of an alternate embodiment of the module of FIG. 2.

Bypass circuit 26 preferably comprises a bypass resistor R19 to divert charging current from a battery that is exceeding its over-voltage limit. An alternative bypass circuit 26 is shown in FIG. 5, and uses a transformer-coupled DC to DC converter to recoup most of the power that would otherwise be lost in a bypass resistor. The preferred schematic for this embodiment is identical to that of FIG. 2, with the exception of the bypass control circuit 28 and bypass circuit 26. Bypass control circuit 28 now includes an additional timer integrated circuit U3A and associated timing components R27, R28 and C3. The output Q1 of monostable U2A goes high when triggered by an over-voltage condition and turns on transistor T1, as before. However, output Q1 is now connected to a reset input RST3 to U3A. U3A, preferably an industry standard 555 single timer I.C., is configured as an astable multivibrator. Its output Q3 oscillates at a frequency determined by R27, R28 and C3 as long as its RST3 input is at a logic "1" state. The values of R27, R28 and C3 are preferably 10.0 kΩ, 20.0 kΩ, and 0.001 μF, respectively, giving output Q3 a frequency of about 30 kHz and a duty cycle of about 0.40 when oscillating.

Bypass circuit 26 is now a flyback type of DC to DC converter instead of a resistor, with the converter comprising a transistor T4, preferably a MOSFET, a step-up transformer XF1, a low voltage capacitor C4, a high voltage filter capacitor C5 and a flyback diode D3. The output Q3 of astable U3A is connected to the gate of transistor T4. The primary winding terminal of XF1 indicated by a phasing dot in FIG. 5 is connected to the battery voltage V+ and to the positive terminal of a capacitor C4, preferably implemented with six 220 μF, 25 volt capacitors connected in parallel, with the other side of C4 connected to V−. The other primary winding terminal is connected to the drain of transistor T4. The secondary winding terminal of transformer XF1 marked with a phasing dot in FIG. 5 is connected to one terminal of a filter capacitor C5, preferably 0.1 μF, and to the negative terminal 18 of a battery string 12. The other terminal of the secondary winding is connected to the anode of a flyback diode D3, with D3's cathode connected to the other side of C5 and to the positive terminal 16 of battery string 12.

When an over-voltage condition occurs, U2A is triggered, Q1 goes high, and the output Q3 of astable U3A is free to oscillate at about 30 kHz; this causes transistor T4 to be switched on and off at a rate of 30,000 times per second. While T4 is turned on, current flows from V+, through the primary winding and T4 to V−, storing energy in XF1's magnetizing inductance. When T4 turns off, the stored energy causes the voltage across the secondary winding to assume a magnitude and polarity that causes the flyback diode D3 to conduct unidirectional transformer secondary current into the string's positive terminal 16 and out of string's negative terminal 18. This current serves as a charging current for the string. Each module in a string uses a DC to DC converter in this way, and the outputs of all the converters are connected in parallel. The currents from all the converters in the string thus sum into a single bypass power recuperation current that adds to the charging current supplied by the battery pack charger 14. Design of flyback type DC to DC converters is described in A. Pressman, *Switching Power Supply Design*, Mcgraw-Hill (1991), pp. 105–115. XF1 is preferably a custom-designed transformer having a turns ratio of 1:20, a primary inductance of 76.0 µH max., a leakage inductance of 1.50 µH max., a primary resistance of 0.035Ω max., a secondary resistance of 17.0Ω max., and a hipot test voltage of 800 Vac. D3 is preferably a MUR160 from Motorola, Inc. and T4 is preferably an IRFZ40 from International Rectifier Corp.

During the final portion of a charge cycle, the batteries in a string each come to full charge and are bypassed by the DC to DC converter as their battery voltage exceeds the over-voltage limit. As a result, the recuperation current from the summed outputs of the DC to DC converters increases. With a constant current being delivered by the charger 14, the net charge current into the string also increases. As the batteries in the string become less receptive to charge current, the amount of current drawn by the DC to DC converters is no longer able to reduce the voltage of certain batteries below their over-voltage limit. The controller 38 detects the persistent over-voltage conditions of those batteries and responds by commanding a reduced current from the charger 14.

By using a DC to DC converter as a bypass circuit 26 instead of a resistor, charge efficiency is improved, and the heat produced by a module is reduced. However, these benefits are counterbalanced with a higher manufacturing cost and the need to interconnect the batteries with conductors that carry the full battery string potential. A self-heating feature described below is also unavailable if bypass resistors are not used.

The invention offers a self-heating feature when the bypass circuit 26 uses a bypass resistor to divert charge current from a respective battery. The resistor may be deliberately activated in order to heat some or all of the battery string in cold weather conditions. Referring back to FIG. 2, an optocoupler OC2 comprising a photodiode 104 and a phototransistor 106 is connected between bidirectional addressable switch 32 and the trigger input TR1 to monostable U2A. To activate the bypass resistor on a particular module, the controller 38 impresses the address of the module's switch onto the LAN followed by a WRITE DATA command that turns on the MOSFET that is internal to the addressable switch 32, bringing the PIO pin of the switch to a logic "0" state and providing a current path between the switch's PIO pin and its SCOM pin. A current path is thus created from the +5 V line of the LAN cable, through a resistor R26, preferably 1 kΩ, through the photodiode 104 of OC2, and through the PIO pin, the internal MOSFET, and the switch's SCOM line to the LAN's COM line. The current flowing through photodiode 104 turns on phototransistor 106 that has its emitter connected to V− and its collector connected to trigger input TR1. Turning phototransistor 106 on pulls the trigger input to a logic "0" state, triggering the monostable U2A and switching bypass resistor R19 across the battery terminals. As long as the addressable switch 32 remains in a WRITE DATA mode and the PIO pin is kept at logic "0", R19 remains connected across the battery and gives off heat to warm its own battery as well as the surrounding environment.

The addressable switch is preferably a type DS2407, from Dallas Semiconductor, though other communication devices having an interface pin whose logic level can be written to or received from a controller upon command will also serve. The DS2407 contains 1024 bits of EPROM, which is used to store an identification number for the battery that the switch is associated with when the module is installed. The allows controller 38 to determine the identification number of the battery producing a particular over-voltage, under-voltage, float-voltage or over-temperature indication.

The optocouplers are preferably 4N25's, from Motorola, Inc. All resistors except bypass resistor R19 are preferably 1% metal film resistors. T1, T2 and T3 are preferably MOSFETs capable of carrying the current required by the module circuitry. T1 must be able to conduct the current flowing through the bypass resistor, which is about 3 amps for a 15 volts battery with a 5Ω bypass resistor. A IRFZ20 power MOSFET from International Rectifier is preferred. Using the component values shown in FIG. 2, T2 and T3 carry about 4 ma and 6 ma respectively. A BS170 signal MOSFET from International Rectifier is preferred for these two transistors. Other types of transistors will also serve, provided that they can conduct the necessary current with a voltage drop comparable to that of a MOSFET.

Note that the comparison functions performed by the module, accomplished with comparators U1A, B, C and D, and the timing functions preferably provided by timer ICs U2A and B, could also easily be provided by a microprocessor on the module. In this case, the monitoring and bypass control functions would not be realized as physical subcircuits, but would mainly be performed with software in the microprocessor.

The networked battery monitor and control system is primarily intended for use with multi-cell VRLA batteries. It is also applicable to flooded lead-acid batteries, and other battery chemistries for which overcharging or undercharging can result in a shortened lifespan or a hazardous condition.

While particular embodiments of the invention have been shown and described, numerous variations and alternate embodiments will occur to those skilled in the art. Accordingly, it is intended that the invention be limited only in terms of the appended claims.

I claim:

1. A networked battery monitor and control system, comprising:

monitor circuitry to compare at least one parameter of each battery in a group of batteries with predetermined limits, said monitor circuitry producing go/no-go signals with respect to each of said limits, bypass circuitry responsive to said monitor circuitry and connectable across the terminals of individual batteries when their respective battery voltages exceed respective predetermined limits, to reduce the amount of charging current flowing through them, a controller that receives said go/no-go signals and reduces the charging current to a group of batteries when said bypass circuitry is unable to reduce the voltage of a battery in the group below a predetermined limit, said controller located remote from said monitor circuitry, and cabling interconnecting said monitor circuitry and said remote controller for carrying said go/no-go signals between them.

2. The system of claim 1, further comprising a local area network (LAN) for conveying said go/no-go signals to said controller.

3. A networked battery monitor and control system, comprising:
- a plurality of modules, each of said modules connectable to the terminals of a respective battery that is one of a series string of batteries, said modules each comprising:
  - monitor circuitry to compare at least one parameter of a respective battery with predetermined limits, said circuitry producing a go/no-go signal with respect to each of said limits,
  - a bypass circuit connectable across the terminals of a battery to reduce charging current to the battery,
  - bypass control circuitry responsive to said monitor circuitry to connect said bypass circuit across the terminals of a battery when the battery's voltage exceeds a predetermined limit, and
  - at least one addressable switch, said switch connectable to a local area network, said switch making said go/no-go signals available to said network when addressed,
- a local area network cable, said cable connected to each of said addressable switches, and
- a network controller connected to said cable, said controller addressing each of said switches in turn and determining the state of said go/no-go signals, said controller programmed to control the charging and discharging of a series string of batteries based on the states of said signals.

4. The system of claim 3, further comprising a plurality of temperature sensors connectable to a terminal of a respective battery, each sensor providing an output that varies with temperature to said monitor circuitry in respective modules.

5. The system of claim 3, wherein said monitor circuitry monitors a respective battery for over-temperature, over-voltage, under-voltage, and float-voltage conditions.

6. The system of claim 3, wherein each of said modules is in close physical contact with the terminals of a respective battery such that no separate insulated conductors are required to interface to said battery.

7. The system of claim 3, further comprising a battery pack charger connectable to a series string of batteries, said charger controllable by said network controller.

8. The system of claim 3, wherein said network controller causes a battery pack charger connected across a series string of batteries to reduce the charging current to the string if the voltage of a battery in the string does not fall below a predetermined limit when said bypass circuit is connected across the battery's terminals.

9. The system of claim 3, wherein said bypass circuit includes a bypass resistor.

10. The system of claim 9, wherein said bypass resistor is a distributed resistor made from a circuit board trace.

11. The system of claim 3, wherein said bypass circuit includes a DC to DC converter having inputs connectable across a respective battery's terminals and having outputs connectable to the top and bottom of a string of batteries.

12. The system of claim 3, further comprising at least one hydrogen detector located within a compartment holding a series string of batteries, said detector causing the string to be disconnected from said system when a predetermined hydrogen concentration limit is exceeded in said compartment.

13. The system of claim 3, further comprising at least one temperature sensor located within a compartment holding a series string of batteries, said sensor causing the string to be disconnected from said system when a predetermined temperature limit is exceeded in said compartment.

14. The system of claim 3, further comprising a discharge controller connected to a series string of batteries to control the discharge of the string, said discharge controller controllable by said network controller.

15. The system of claim 14, wherein said discharge controller is a traction inverter.

16. The system of claim 3, further comprising a contactor connectable in series with a series string of batteries, to connect and disconnect the string to and from said system.

17. The system of claim 3, wherein said string is disconnected from said system when all batteries in said string are fully charged.

18. The system of claim 3, wherein said switches are bidirectional such that said network controller can command an action to occur on a module by addressing and writing to a switch on said module.

19. The system of claim 18, wherein said action comprises connecting said bypass circuit across the terminals of a battery to cause heat to be generated.

20. The system of claim 3, wherein said monitor circuitry comprises a microprocessor suitable for performing said comparisons between said battery parameters and said predetermined limits, producing said go/no-go signals, and providing system timing functions.

21. A networked battery monitor and control system, comprising:
- a plurality of batteries connected in series to form a series string,
- a plurality of modules, each of said modules connectable to the terminals of a respective one of said batteries, said modules each comprising:
  - monitor circuitry to compare at least one parameter of the module's respective battery with predetermined limits, said circuitry producing a go/no-go signal with respect to each of said limits,
  - a bypass circuit connectable across the terminals of the module's respective battery to reduce charging current to the battery,
  - bypass control circuitry responsive to said monitor circuitry to connect said bypass circuit across the terminals of the module's respective battery when the battery's voltage exceeds a predetermined limit, and
  - at least one addressable switch, said switch connectable to a local area network, said switch making said go/no-go signals available to said network when addressed,
- a local area network cable, said cable connected to each of said addressable switches, and
- a network controller connected to said cable, said controller addressing each of said switches in turn and determining the state of said go/no-go signals, said controller programmed to control the charging and discharging of said series string of batteries based on the states of said signals.

22. The system of claim 21, wherein said system includes four series strings of 28 batteries, said strings connected in parallel.

23. A networked battery monitor and control system, comprising:
- a plurality of modules, each of said modules connectable to the terminals of a respective battery that is one of a series string of batteries, said modules each comprising:

monitor circuitry to compare at least one parameter of a respective battery with predetermined limits, said circuitry producing a go/no-go signal with respect to each of said limits, and at least one addressable communication device, said device making said go/no-go signals available to a controller when addressed, a controller that addresses each of said devices and determines the state of said go/no-go signals, said controller reducing charging current to a series string of batteries when the voltage of a battery in the string exceeds a predetermined limit, said controller located remote from said monitor circuitry, and cabling interconnecting said monitor circuitry and said remote controller for carrying said go/no-go signal between them.

24. The system of claim 23, further comprising bypass circuitry responsive to said monitor circuitry and connectable across the terminals of individual batteries when their respective battery voltages exceed one of said predetermined limits, to reduce the amount of charging current flowing into them.

25. A battery monitor and control module, comprising:

a plurality of comparators suitable for connection to a battery to compare the voltage and temperature of a battery with predetermined limits and to change the logic state of respective outputs if said limits are exceeded, a voltage reference for supplying threshold voltages to each of said comparators, said threshold voltages representing different respective predetermined limits, a bypass circuit connectable to the terminals of a battery to reduce charging current to the battery when the battery's voltage exceeds an over-voltage limit, and at least one communication device, said at least one device connected to receive a combination of said comparator outputs at respective inputs and having respective outputs that assume the state of said respective inputs when said device is interrogated.

26. The module of claim 25, wherein said comparators include an over-voltage limit comparator, an under-voltage limit comparator, an over-temperature limit comparator, and a float-voltage limit comparator.

27. A battery monitor and control module, comprising:

a plurality of comparators suitable for connection to a battery to compare the voltage and temperature of a battery with predetermined limits and to change the logic state of respective outputs if said limits are exceeded, a voltage reference for supplying threshold voltages to each of said comparators, said threshold voltages representing different respective predetermined limits, a bypass circuit connectable to the terminals of a battery to reduce charging current to the battery when the battery's voltage exceeds an over-voltage limit, and at least one communication device, said at least one device connected to receive a combination of said comparator outputs at respective inputs and having respective outputs that assume the state of said respective inputs when said device is interrogated, wherein said communication devices are addressable switches.

28. A battery monitor and control module, comprising:

a plurality of comparators suitable for connection to a battery to compare the voltage and temperature of a battery with predetermined limits and to change the logic state of respective outputs if said limits are exceeded, a voltage reference for supplying threshold voltages to each of said comparators, said threshold voltages representing different respective predetermined limits, a bypass circuit connectable to the terminals of a battery to reduce charging current to the battery when the battery's voltage exceeds an over-voltage limit, and at least one communication device, said at least one device connected to receive a combination of said comparator outputs at respective inputs and having respective outputs that assume the state of said respective inputs when said device is interrogated, wherein said communication devices comprise a single one-bit addressable switch.

29. A battery monitor and control module, comprising:

a plurality of comparators suitable for connection to a battery to compare the voltage and temperature of a battery with predetermined limits and to change the logic state of respective outputs if said limits are exceeded, a voltage reference for supplying threshold voltages to each of said comparators, said threshold voltages representing different respective predetermined limits, a bypass circuit connectable to the terminals of a battery to reduce charging current to the battery when the battery's voltage exceeds an over-voltage limit, at least one communication device, said at least one device connected to receive a combination of said comparator outputs at respective inputs and having respective outputs that assume the state of said respective inputs when said device is interrogated, and a timing circuit that connects said bypass circuit across a battery's terminals for a predetermined amount of time to reduce charge current to the battery.

30. The module of claim 25, wherein said bypass circuit comprises a resistor.

31. The module of claim 30, wherein said resistor is formed from a circuit board trace.

32. The module of claim 25, wherein said bypass circuit comprises a DC to DC converter having inputs that are connectable across a battery's terminals and outputs connectable to the top and bottom of a series string of batteries.

33. A battery monitor and control module, comprising:

a plurality of comparators suitable for connection to a battery to compare the voltage and temperature of a battery with predetermined limits and to change the logic state of respective outputs if said limits are exceeded, a voltage reference for supplying threshold voltages to each of said comparators, said threshold voltages representing different respective predetermined limits, a bypass circuit connectable to the terminals of a battery to reduce charging current to the battery when the battery's voltage exceeds an over-voltage limit, at least one communication device, said at least one device connected to receive a combination of said comparator outputs at respective inputs and having respective outputs that assume the state of said respective inputs when said device is interrogated, and an electrical isolation barrier between said addressable switches and said comparator outputs.

34. The module of claim 33, wherein said electrical isolation barrier is comprised of optocouplers.

35. The module of claim 25, further comprising a temperature sensor suitable for attachment to a battery and producing an output that varies in accordance with the battery's temperature, said module receiving and using said sensor output to bias a voltage received from the battery as a function of the battery's temperature, said biased voltage being used for comparison with said predetermined limits.

36. The module of claim 25, further comprising a battery connected to said module, said module comparing parameters of said battery with said predetermined limits and to change the logic state of respective outputs when said limits are exceeded and making said outputs available for interrogation through said communication devices.

37. The module of claim 36, wherein said module is mounted to said battery such that the terminals of said battery are directly connectable to said module without intervening insulated conductors.

38. A method of charging a series string of batteries, comprising the steps of:

applying a predetermined amount of charging current through a string of series-connected batteries, monitoring the voltage of each battery making up said series string, bypassing a portion of said charging current around any individual battery in the string whose voltage exceeds an over-voltage limit, reducing the charging current through said string if the voltage of any battery that is exceeding said over-voltage limit does not fall below said limit after a predetermined amount of time, the value of said reduced charging current being greater than zero, terminating said charging current through said string when the voltage of each battery making up said string exceeds a predetermined limit.

39. The method of claim 38, wherein said bypassing of charging current around an individual battery is accomplished by switching a bypass resistor across the terminals of said battery.

* * * * *